United States Patent
Alaze

(10) Patent No.: US 7,681,490 B2
(45) Date of Patent: Mar. 23, 2010

(54) DRIVE DEVICE

(75) Inventor: Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 11/721,883

(22) PCT Filed: Nov. 2, 2005

(86) PCT No.: PCT/EP2005/055687

§ 371 (c)(1),
(2), (4) Date: Jun. 15, 2007

(87) PCT Pub. No.: WO2006/066995

PCT Pub. Date: Jun. 29, 2006

(65) Prior Publication Data

US 2009/0123304 A1    May 14, 2009

(30) Foreign Application Priority Data

Dec. 22, 2004   (DE) .................. 10 2004 061 812

(51) Int. Cl.
*F04B 1/04*   (2006.01)
*F04B 9/04*   (2006.01)

(52) U.S. Cl. .................... 92/68; 92/72; 91/491

(58) Field of Classification Search ............ 92/68, 92/72, 84; 91/491, 492
See application file for complete search history.

(56) References Cited

U.S. PATENT DOCUMENTS

| | | | | |
|---|---|---|---|---|
| 3,847,456 A | * | 11/1974 | Schwarzbich | 384/620 |
| 5,230,275 A | * | 7/1993 | Hodge et al. | 92/68 |
| 5,642,988 A | * | 7/1997 | Zorn | 417/273 |
| 5,842,405 A | | 12/1998 | Schaefer et al. | |
| 6,641,232 B1 | | 11/2003 | Alaze | |
| 6,769,351 B2 | * | 8/2004 | Lang et al. | 92/72 |

FOREIGN PATENT DOCUMENTS

DE   103 07 128 B3   7/2004
DE   10307128 B3 *   7/2004

* cited by examiner

*Primary Examiner*—Thomas E Lazo
(74) *Attorney, Agent, or Firm*—Ronald E. Greigg

(57) ABSTRACT

The invention relates to a drive device for a piston pump of a braking system of a vehicle having at least one piston element displaced in the longitudinal direction in a housing between an upper dead center and a lower dead center by means of an eccentric device. The eccentric device comprises at least one cam-shaped eccentric element having a covering surface forming a control curve which is used to control the displacement of the piston element. A roller bearing device is arranged between the control curve of the eccentric element and the piston element, which has such an elasticity that the piston element can be controlled according the predefined contour of the control curve of the eccentric element.

10 Claims, 1 Drawing Sheet

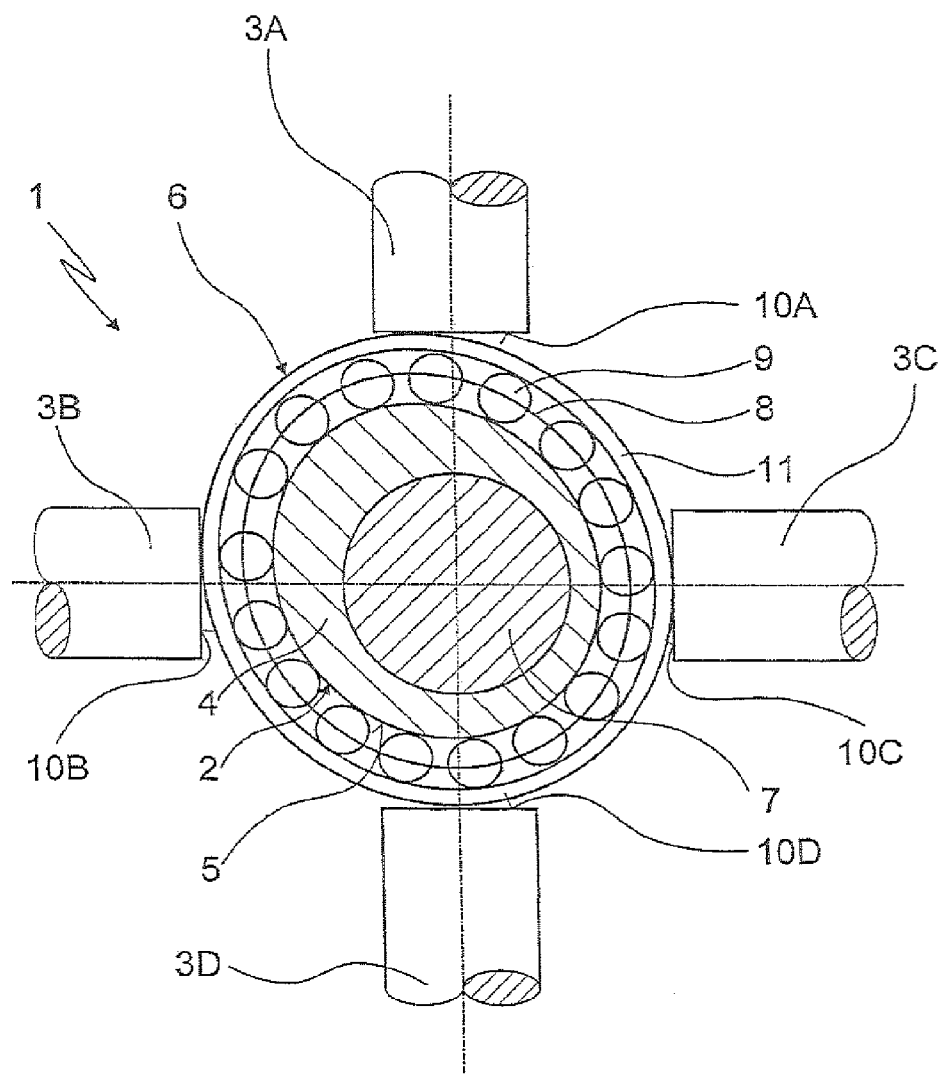

DRIVE DEVICE

CROSS-REFERENCE TO RELATED APPLICATION

This application is a 35 USC 371 application of PCT/EP 2005/055687 filed on Nov. 2, 2005.

BACKGROUND OF THE INVENTION

1. Field of the Invention

The invention relates to a drive device suitable for use, for example, for driving a piston pump.

2. Description of the Prior Art

Piston pumps known in the industry are embodied for instance with eccentric devices or eccentric drives, by means of which rotary motions of a shaft such as this shaft of an electric motor are converted, via an eccentricity disposed on the motor shaft, into translational motions of the piston elements of the piston pumps. The translational motion of a piston element of a piston pump, given a circular eccentricity, corresponds to a sinusoidal motion whose zero crossovers each occur cyclically after an angle of motor shaft rotation of 180°. In general, one operating cycle of a piston pump includes one intake phase and an ensuing pumping phase of the piston pump, which occur cyclically in succession over an angle of motor shaft rotation of 360° and each take place within one-half of an operating cycle.

To even out pressure pulsation of a piston pump over the operating cycle of the piston pump without additional piston elements, camlike eccentricities are employed. The use of camlike eccentricities offers the capability of increasing the proportion of the pumping phase of a piston pump relative to an intake phase in one operating cycle of a piston pump. If the stroke volume of the piston pump is unchanged, this means that the same stroke volume of a piston pump is pumped, during what is now a longer pumping phase, with a lesser pressure increase toward the pumping side of the piston pump.

However, a disadvantage here is that in the region of contact between a piston element of a piston pump and a camlike eccentricity, high sliding friction forces occur, which leads to undesirably high power losses, and such piston pumps are therefore distinguished by a short service life.

SUMMARY AND ADVANTAGES OF THE INVENTION

The drive device of the invention, which can be used particularly for driving a piston pump, embodied with at least one piston element, of a brake system of a vehicle, and by means of which the piston element is movable in the longitudinal direction in a housing between a top dead center and a bottom dead center via an eccentric device, is embodied in the region of its eccentric device with at least one camlike eccentric element whose outer jacket face acts as a control cam for controlling the motion of the piston element. Between the control cam of the eccentric element and the piston element, a roller bearing device is provided, which is embodied with an elasticity such that the piston element is triggerable in accordance with the predefined contour of the control cam of the eccentric element.

As a result, the friction in the region between a piston element of a piston pump and a camlike eccentric element is reduced substantially, compared to conventional drives of piston pumps, since instead of a slide bearing, which is distinguished by high coefficients of friction, a roller bearing is provided, which causes substantially lower friction parameters.

The drive device of the invention thus combines the advantages of a cam control, in which the pumping angle of a piston pump for evening out pressure pulsation can be made greater than 180°, with low friction stress on the components in the contact region between a camlike eccentricity of an eccentric device and the face end of a piston element of a piston pump.

This means that the pumping flow or pressure pulsation of a piston pump, viewed over the entire operating cycle, has a low degree of unevenness because of the use of a drive device embodied according to the invention, and both the driven piston pump and the drive device are distinguished by a longer service life, because of the reduced friction in comparison to the systems known in the industry.

Further advantages and advantageous features of the subject of the invention are disclosed.

BRIEF DESCRIPTION OF THE DRAWING

Other features and advantages of the invention will become apparent from the description contained herein below, taken with the sole drawing FIGURE which is a cross-sectional view of a drive device of the invention.

DESCRIPTION OF THE PREFERRED EMBODIMENT

In the drawing, a drive device 1 with an eccentric device 2 is shown in a cross-sectional view, and by means of it piston elements, in the present case four piston elements 3A though 3D of piston pumps, not further shown, can be driven in a housing of the piston pumps translationally between a top dead center and a bottom dead center.

The eccentric device 2 has a camlike eccentric element 4, whose outer jacket face 5 acts as a control cam for controlling the translational motion of the piston elements 3A through 3D. Between the control cam, or the jacket face 5, of the eccentric element 4 and the piston elements 3A through 3D, a roller bearing device 6 is provided. The roller bearing device 6 is embodied with an elasticity such that the piston elements 3A through 3D are triggered in accordance with the predefined contour of the control cam of the eccentric element 4, even though the roller bearing device 6 is located between them.

The camlike eccentric element 4 is disposed, in a manner fixed against relative rotation, on a motor shaft 7 of an electric motor, not shown in further detail and known per se, so that the rotational drive of the electric motor is converted into the translational motion of each of the piston elements 3A through 3D.

The roller bearing device 6 in the present case includes a plurality of roller elements 9, operatively connected via an elastic bearing cage 8, which in the installed state of the roller bearing device 6 are embraced by an elastic outer bearing ring 11 located between the end faces 10A through 10D, oriented toward the eccentric device 2, of the piston elements 3A through 3D and the roller elements 9.

The outer bearing ring 11 and the bearing cage 8 are embodied with an elasticity such that the contour of the outer bearing ring 11 in the region of contact of the bearing ring 11 with the end faces 10A through 10D of the piston elements 3A through 3D correspond substantially to the contour of the camlike eccentric element 4.

The roller bodies 9, embodied in this case as cylindrical rollers, are spaced apart from one another by means of the bearing cage 8. In the present case, the bearing cage 8 is produced from hardened spring steel, so that the bearing cage 8, in the operation of the drive device 1, can in the same way as the outer bearing ring 11 follow the outer contour, shown in cross section in the drawing, of the camlike eccentric element 4, and the piston elements 3A through 3D can be triggered in accordance with the control cam of the eccentric device 2.

It is understood that it is left to the judgment of one skilled in the art to produce the bearing cage from a suitable plastic, or some other suitable material, depending on the particular application in question, so that the roller bodies 9 can be guided, spaced apart from one another, by means of the bearing cage 8 between the eccentric element 4 and the outer bearing ring 11 in the manner required for perfect functioning of the roller bearing device 6. At the same time, the selected material of the bearing cage must assure the elasticity of the bearing cage desired for the adaptation of the roller bearing device 6 to the contour of the eccentric element 4.

The outer bearing ring 11 in this case is produced from spring steel and is embodied as a closed outer ring. To enable transmitting the greatest possible piston force via the elastic outer bearing ring 11, the number and diameter of the roller bodies 9 are selected such that the force transmission is effected from the piston elements 3A through 3D to the camlike eccentric element 4 via the elastic outer bearing ring 11 in all operating situations via one roller body or preferably simultaneously via a plurality of roller bodies.

The above-described embodiment of a drive device of the invention is fundamentally suitable for driving hydraulic equipment, and in particular ABS, ESP or EHB systems. The drive device of the invention can be used in particular for ABP applications, in which for reasons of noise, two piston pumps or one piston pump in combination with a compensation piston are provided per hydraulic circuit.

The foregoing relates to a preferred exemplary embodiment of the invention, it being understood that other variants and embodiments thereof are possible within the spirit and scope of the invention, the latter being defined by the appended claims.

The invention claimed is:

1. A drive device for a piston pump comprising at least one piston element of a brake system of a vehicle, by means of which device the at least one piston element is movable via an eccentric device in the longitudinal direction in a housing between a top dead center and a bottom dead center, the eccentric device having at least one noncircular eccentric element whose outer jacket face acts as a control cam for controlling the motion of the piston element, and a roller bearing device between the control cam of the eccentric element and the at least one piston element, the roller bearing device having an elasticity such that the motion of the piston element is controlled in accordance with the predefined contour of the control cam of the eccentric element, wherein the roller bearing device comprises a plurality of roller elements operatively connected via an elastic bearing cage, and an elastic outer bearing ring embracing the roller elements, the bearing ring in the installed state of the roller bearing device being disposed between the end face, oriented toward the eccentric device, of the piston element and the roller elements, and wherein the bearing ring and the bearing cage are embodied with an elasticity such that the contour of the outer bearing ring in the region of contact with the end face of the piston element corresponds to the noncircular contour of the eccentric element.

2. The drive device as defined by claim 1, wherein the bearing cage is formed of plastic.

3. The drive device as defined by claim 2, wherein the outer bearing ring is produced from spring steel.

4. The drive device as defined by claim 2, wherein a number of the roller elements and an outer diameter of the roller elements are provided in such a way, as a function of the control cam of the eccentric element, that a bending stress of the outer bearing ring in the region of contact with the piston element is minimal.

5. The drive device as defined by claim 1, wherein the bearing cage is produced from hardened spring steel.

6. The drive device as defined by claim 5, wherein the outer bearing ring is produced from spring steel.

7. The drive device as defined by claim 5, wherein a number of the roller elements and an outer diameter of the roller elements are provided in such a way, as a function of the control cam of the eccentric element, that a bending stress of the outer bearing ring in the region of contact with the piston element is minimal.

8. The drive device as defined by claim 1, wherein the outer bearing ring is produced from spring steel.

9. The drive device as defined by claim 8, wherein a number of the roller elements and an outer diameter of the roller elements are provided in such a way, as a function of the control cam of the eccentric element, that a bending stress of the outer bearing ring in the region of contact with the piston element is minimal.

10. The drive device as defined by claim 1, wherein a number of the roller elements and an outer diameter of the roller elements are provided in such a way, as a function of the control cam of the eccentric element, that a bending stress of the outer bearing ring in the region of contact with the piston element is minimal.

* * * * *